Nov. 8, 1927.
H. J. BOEDECKER
ANIMAL TRAP
Filed May 26, 1927
1,648,160
3 Sheets-Sheet 1
Fig. 1.
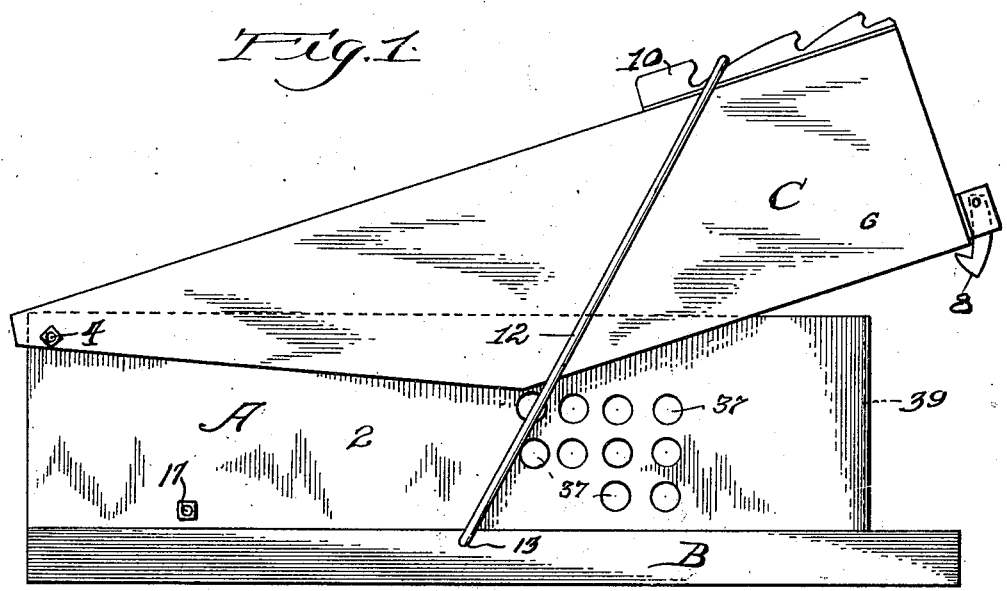
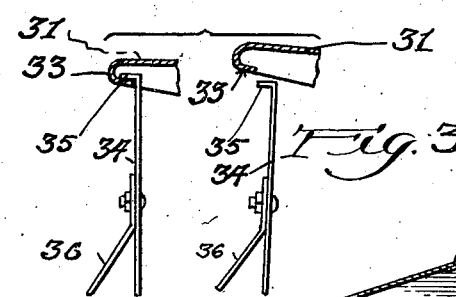
Fig. 3.
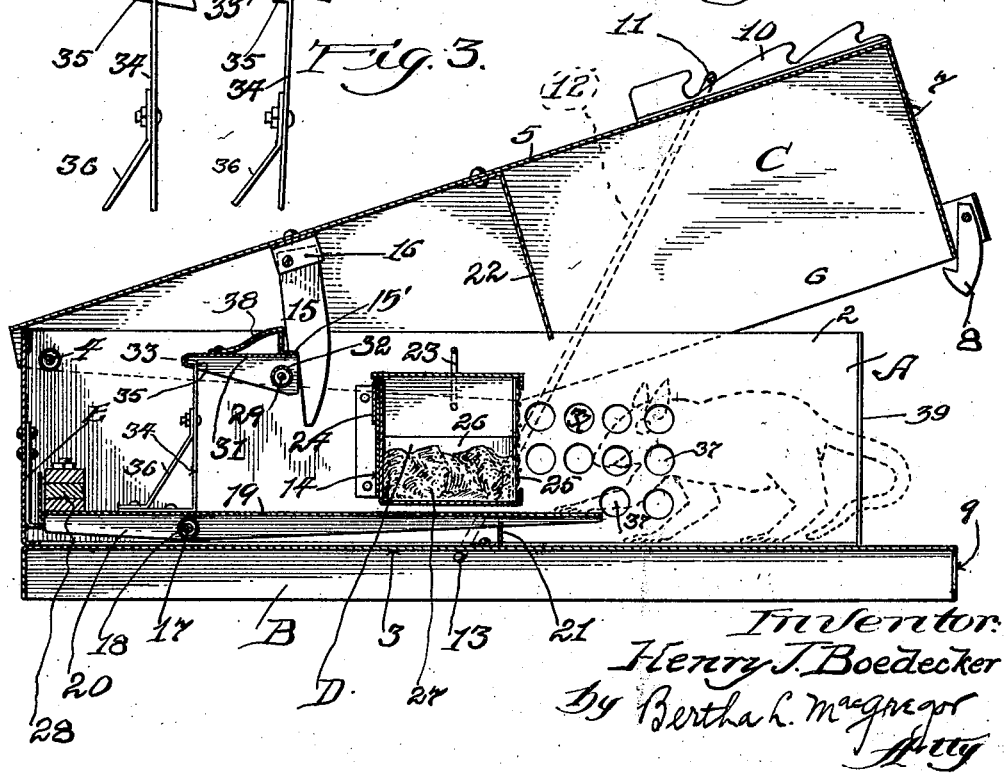
Fig. 2.
Inventor.
Henry J. Boedecker
by Bertha L. MacGregor
Atty

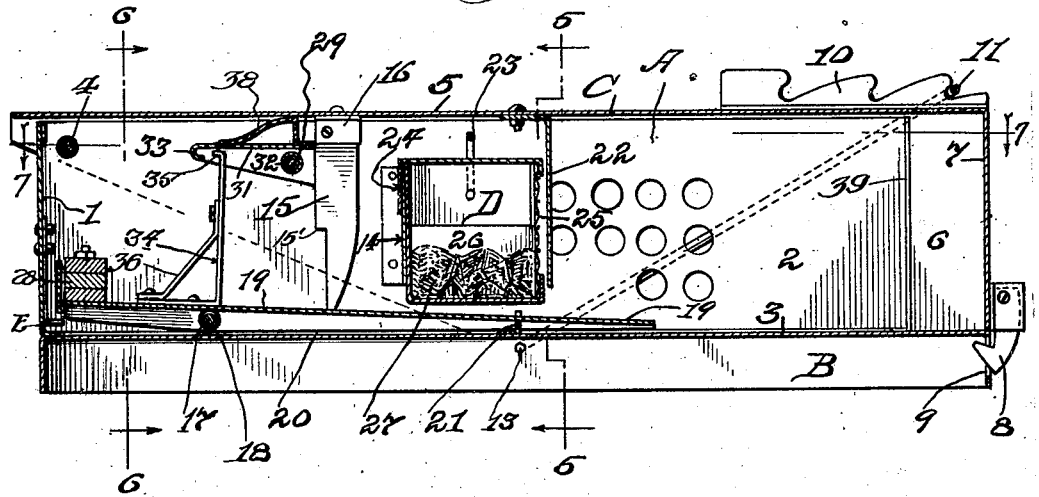
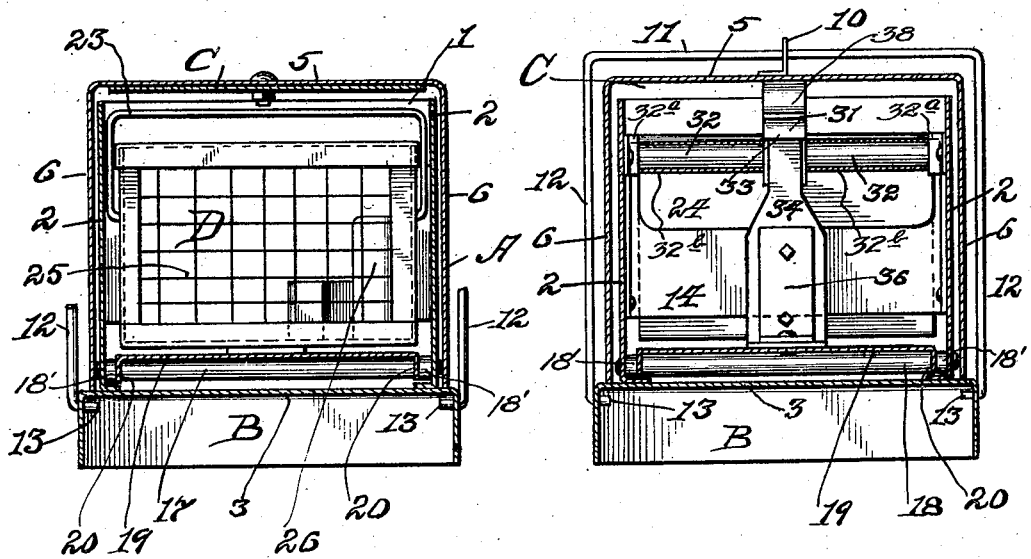

Nov. 8, 1927.

H. J. BOEDECKER 1,648,160

ANIMAL TRAP

Filed May 26, 1927   3 Sheets-Sheet 3

Patented Nov. 8, 1927.

1,648,160

UNITED STATES PATENT OFFICE.

HENRY J. BOEDECKER, OF WAVERLY, IOWA.

ANIMAL TRAP.

Application filed May 26, 1927. Serial No. 194,452.

This invention relates to animal traps and consists in the novel devices and combination of devices illustrated in the accompanying drawing and herein described, and more particularly pointed out in the subjoined claims.

In the drawings:

Figure 1 is an outside or side elevation of a trap constructed in accordance with my invention, the cover being shown raised, as when the trap is "set" to receive the animal to be trapped.

Figure 2 is a view of the trap in the same position, but in central, longitudinal vertical section to show the interior parts, and showing in dotted lines the animal entering and about to spring the trap.

Figure 3 is a vertical sectional view of the trap setting detail in two positions, drawn on an enlarged scale.

Figure 4 is a longitudinal sectional view, similar to Figure 2, with the cover down.

Figure 5 is a transverse sectional view, taken in the vertical plane indicated by the dotted line 5—5 of Figure 4, and looking in the direction indicated by the arrows.

Figure 6 is a similar sectional view taken in the vertical plane indicated by the dotted line 6—6 of Figure 4, looking in the direction indicated by the arrow.

Figure 7 is an inside or plan view of the trap of Figure 4, some of the parts being sectioned in a horizontal plane.

Figure 8 is a sectional view similar to Figures 2 and 4, but on an enlarged scale and showing, by full and by dotted lines, two positions of the swinging arm 15.

Figure 9 is a sectional view, also enlarged, taken transversely of the box on the vertical plane of the dotted line 9—9 of Figure 8, to more clearly show certain details.

Figure 10 is a detailed sectional view also enlarged to show the "push off" action respecting the swinging arm 15.

In said drawings, the strap is shown as comprising a main or box member indicated as a whole by the letter A, set upon a suitable base indicated as a whole at B,—the top 3 of the base constituting the bottom or floor of the box A. The box A comprises a rear wall 1 and two side walls 2, 2, and is therefore open at its top and at its forward end, and as shown is an elongated structure, rectangular in cross section. It is made of any suitable material, but is herein illustrated as made from metal, such as thin galvanized sheet iron.

Pivotally secured at 4 to the side walls 2, is a cover member designated as a whole by the letter C, comprising a top 5, two side flange walls 6, and a front end member 7. The width of the cover C will be such that the side walls 6 will have a telescoping fit over the side walls 2 of the box A, and the length of the cover C will be substantially the length of the base B.

The forward end 7 of the cover C may be provided with any suitable latching device adapted to engage the base B when the cover is down and the trap closed, the latching device herein illustrated being the pivoted hook latch 8 adapted to automatically engage an aperture 9 on the front end of the base B.

Upon the top of the forward or swinging end of the cover C is a notched rib 10, adapted to be engaged by the cross member 11 of a wire bail 12, the arms of which pass about the cover C and box A and have inturned pivotal connections with the base B as indicated at 13.

Fastened to the top wall 5 of the cover C and adapted to project into the box A in front of the bait box D is a partition member 22. Between said partition and the pivotal connection 4 there is located a swinging arm 15, notched at 15′ for a purpose later to be explained, which is pivotally secured by a bracket 16 to the inside of the top 5 of the cover C.

In the box A and riveted to the side walls 2, 2 is a transverse partition 14, to which the bait box D is removably secured. Extending across the box A and secured to the side walls 2, 2 is a transversely disposed shaft or bolt 17, surrounded by a suitable tubular member 18. 19 is a tilting platform which extends lengthwise within the box A and is provided on its two longitudinal sides with depending, strengthening ribs 20. The platform 19 rocks or tilts about the stationary bearing 18 and shaft 17. Loose tubular members 18′ surround the tubular bearing 18 between the flanges 20 of the platform 19 and the side walls 2, 2, to keep the platform in its proper central position within the box A, as best shown in Figure 9.

A partition 21 is located on the top 3 of the base B and extends transversely across the structure between the two side walls 2, 2. The partition 21 is suitably notched to let the platform 19 fit loosely over said partition 21.

The partition 22 of the cover C is of a length so that when the cover is down, the lower edge of the partition 22 will be above the tilting platform 19 and will not contact therewith.

The bait box D is removable and may be handled by a swinging wire bail 23. The box D is firmly secured against the front of the partition 14 by means of the short piece of bent metal 24, which is slipped down over the top part of the partition 14 and holds the bait box clear of the platform 19, i. e., about a quarter of an inch above the platform. The forward end or face of the removable bait box is provided with a wire net indicated at 25, and within the bait box is a water cup 26 and suitable bait 27. At the rear end of the box and properly secured to the tilting platform is a weight or a series of weights 28, so arranged as to balance the platform 19 and hold it in proper position.

Referring now to the mechanism for setting the trap, it will be noted that the headed bolt or shaft 29 extends transversely of the box, its end being secured by nut 30 to the brackets 32ª which are secured to the inside of the walls 2, 2. The latch plate 31 tilts on the tubular member 32 at the center thereof, and is held in place by short tubular members 32ᵇ placed over the tubular member 32 between the flanges of the latch plate 31 and brackets 32ª to keep the latching apparatus properly centered. The latch plate 31 is provided with a downwardly extending hook 33. The hook portion 33 of the latch plate 31 is located above and substantially in the same vertical plane as the axis of the transverse shaft 17. Secured to the platform 19 and extending vertically above the same, is a relatively narrow upright plate member 34, its upper margin being bent over at 35 so as to be engaged by the hook portion 33 of the latch plate 31. A brace bar 36 is fastened at one end to the tilt platform 19 and at its upper end to the plate 34. It will be noticed that the construction of the parts illustrated in Figure 2 and in the left hand part of Figure 3, is such that when in latched position, the actual contact between the bent over edge 33 and the hook end 35 is very slight, so that the slightest movement of the tilting platform 19 will almost instantly withdraw the bent over edge 35 from latching contact with the hook 33. If, therefore, when the trap is "set", the latch plate 31 is subjected to a downward pressure, as by the weight of the cover C, through the arm 15, tending to cause it to swing about its shaft 29, there will be sufficient upward pressure on the hook 33 to cause it to hold frictionally against the lower face of the bent edge 35 and thus keep the trap "set". This same pressure will equally cause a tendency to raise the hook 33 away from the bent over part 35 the instant the platform moves, and thus permit the cover C to fall. Attached to the top of the plate 31 is a spring push off device 38 which contacts with the arm 15 when the tilting platform 19 is operated and forces the arm 15 to entirely clear the plate 31 when the cover C drops. It is desirable that the arm 15 quickly slip off the plate 31, and the hook end 33 of the plate 31 drop back upon the part 35 of the upright plate 34, for otherwise the cover C would be prevented from properly closing the trap.

When the cover C is down the lower end of the swinging arm 15 strikes the tilting platform 19, holding the members 33 and 35 disengaged, and in proper position to be engaged when the cover is again lifted and it is desired to set the trap.

An adjusting plate E is fastened to the back 1 of the box A and limits the downward tilt of the rear end of the platform 19. It also regulates the time required for the engagement and disengagement of the parts 33 and 35.

The operation of the device is as follows: A bait 27 is placed within the bait box D. Water may be placed in the water cup 26. The bait box is positioned on the partition 14 above the tilting platform 19 in the box A, as shown in Figure 2. The cover C is raised and the hook 33 locked against the part 35 and held in engagement therewith by the downward pressure of the notched pivotal arm 15 and the weight of the cover C. In this position the trap is set. The distance between the front end of the platform 19 and the open end of the bait box is such that the animal will necessarily enter the box and step upon the forward end of the tilting platform 19 in order to get to the bait. The flanges 39 at the front of the side walls 2 are provided to insure the animal stepping entirely within the box A before he can reach the platform 19. As before stated, very slight pressure upon the forward end of the platform 19 will cause it to rock about the shaft 17 and produce sufficient forward movement of the upright member 34 to disengage the hook 33 by withdrawing the part 35 therefrom, the push off 38 contacting with the arm 15, as heretofore explained. Instantly the weight of the cover C and its leverage from its pivotal point 4 are such as to cause it to rapidly descend and assume the position shown in Figure 4, entrapping the animal and preventing its escape. At the same time the partition 22 moving downward with the cover C closes off the bait box and prevents the animal from reaching the bait. The bail 12 swings with the cover C and its cross arm 11 engages the notched block in flange 10. The latch 8 engages the base B at the aperture 9, thereby locking the cover C to the box A so the animal will be unable to raise and open the cover C. When it is desired to remove the animal from the trap, the forward end may be tilted down into a deep box or barrel and the latch 8 will automatically disengage. The wire bail 11, 12, may then be disengaged from the locking flange 10 so that the cover may be moved and the trap opened.

The apertures in the side walls of the trap indicated at 37 light the trap and are a desirable provision, since I have found animals will ordinarily avoid a dark trap.

The trap may be of any size to accommodate the animal desired to be caught. While I have described the various features of construction in detail, it is manifest that variations may be made, and I do not wish to be limited to details of construction except as pointed out in the appended claims.

I claim as my invention:

1. An animal trap comprising a base, an elongated container, rectangular in cross-section, open at its top and at one end, a cover therefor pivotally mounted upon the closed end of the container and having a depending member adapted to close the open end of the container when the cover is lowered, a platform pivoted within the container and slightly above its floor, the front end of the platform being a considerable distance from the open end of the container, an upright partition above the platform midway it ends, a bait box positioned in front of and removably secured to said partition, balancing weights on the inner end of of the platform, a releasing member upon and actuated by the tilting movement of the platform, a pivoted latch adapted to engage the releasing member, and a pivoted arm on the cover adapted to engage the pivoted latch to hold it in contact with the releasing member when the cover is raised and the trap "set", the releasing member being disengaged from the latch by the minimum of movement of the tilting platform, the weight of the cover causing it to fall very quickly to close the container when the releasing member and the latch are disengaged, a partition member on the cover to conceal the bait box when the cover is down, and automatic means for maintaining the cover when in closed position.

2. An animal trap comprising a box container open at its top and at one end, a flanged cover hinged thereto and having a depending wall adapted to close the open end of the container, a tilting platform within the container, a movable latch member, a release member for the latch, an arm pivotally suspended from the hinged cover and adapted to engage the latch when the trap is set, an upright partition, a bait box removably positioned upon said partition and means for balancing the platform.

3. An animal trap comprising a box container open at its top and at one end, a flanged cover hinged thereto and having a depending wall adapted to close the open end of the container, a tilting platform within the container, a movable latch member, a release member for the latch, an arm pivotally suspended from the hinged cover and adapted to engage the latch when the trap is set, a support having a bait box removably positioned thereon, and means for balancing the platform, the release member being operated by the movement of the tilting platform.

4. An animal trap comprising a box container open at its top and at one end, a flanged cover hinged thereto and having a depending wall adapted to close the open end of the container, a tilting platform within the container, a movable latch member, a release member for the latch, an arm pivotally suspended from the hinged cover and adapted to engage the latch when the trap is set, a bait box removably positioned upon a support, a partition depending from the cover to conceal the bait box when the cover is down, and means for balancing the platform.

In testimony, that I, claim the foregoing as my invention I affix my signature this 23rd day of May, 1927.

HENRY J. BOEDECKER.